Patented Aug. 10, 1948

2,446,836

UNITED STATES PATENT OFFICE 2,446,836

HERBICIDES

Gladys S. King, Metairie, La., assignor to James M. Fountain, Bryan, Tex.

No Drawing. Application November 15, 1946, Serial No. 710,233

16 Claims. (Cl. 167—45)

This invention relates to herbicides and it is particularly concerned with herbicides used for the extermination of plants having complex root structures with nodes and internodes which give rise to lateral shoots and are particularly difficult to exterminate, e. g., the water hyacinth.

Many types of effective herbicides are known today, but these compositions are generally more or less selective in their action. Furthermore, a large number of such compositions are effective only in killing the weeds of very simple morphology having shoots without nodes and very simple vertical roots. Plants of more complex structure are not destroyed by such herbicides. Examples of such plants are those having shoots with nodes and internodes which give rise to lateral shoots, plants which have buds at the base of shoots, as in rhizomes or corms, which give rise to new upright shoots, and plants which have underground or underwater stolens from which new upright plants grow. A water hyacinth is a generally troublesome growing plant coming within the category of such complex plants and is particularly difficult to exterminate.

Herbicides which are effective only against simple plant systems or which do not destroy the root structure of plants, i. e., are not transmigratory in nature, can kill mature plant structures, but new growth rapidly forms from the various buds referred to and soon replace the destroyed plant parts.

A principal object of this invention is the provision of new types of herbicides. Further objects include (1) the provision of herbicides of the transmigratory type which are effective for extermination of plant growths of even the most complex morphology; (2) the provision of herbicides which are modified so as to be effective even in shaded places; (3) the provision of herbicides which induce disintegration of the plants which have been killed by their action; (4) the provision of herbicides which make possible the practical extermination of water hyacinths even from shaded water channels.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

These objects are accomplished according to the present invention by the provision of herbicides which are composed of two basic ingredients. The first ingredient consists of compounds which are extremely active in destroying mature structures of plant growth. These first ingredients comprise the class of compounds consisting of halogenated aryloxy and arylcarboxy monocarboxylic acids, and the esters and salts of these acids.

The second type of ingredient used in the herbicides consists of those compounds which are active in modifying the mature plant growth destructive properties of the first ingredients and are also active in destroying the root structures of the undesirable plants. Such compounds may be classified as aryl substituted monocarboxylic acids, and as aryl beta substituted acrylic acids.

The invention further provides for the modification of the basic herbicides by incorporation therein of catalysts which augment the action of the herbicides and also materials which induce disintegration of the plants once they have been killed by the action of the herbicide.

The success of the present invention is dependent to a large extent upon the discovery that, while the first named ingredients or the second named ingredients of the herbicides are not by themselves effective in the complete extermination of undesirable plants of complex structure, nevertheless, the combination of the two separate classes of ingredients produce herbicides capable of substantially exterminating growing plants of complex structure. Thus, this discovery has made possible the practical extermination of water hyacinths which type of growth, prior to this time, has been substantially impossible to effectively exterminate.

The nature of my herbicides, their manner of production and manner of use may be more fully understood by reference to the following illustrative examples.

Example I

This example relates to a liquid spray for application to an acre of weeds at the rate of 300 gallons per acre.

300 gallons of water are used as a carrier base for the herbicidal spray. To this quantity of water, there is added 0.1% glycerine, 1000 P. P. M. of 2,4-dichlorophenoxyacetic acid and 400 P. P. M. of trans-cinnamic acid.

This herbicidal spray was applied to water hyacinths ranging in height from 22 to 40 inches, growing during the summer in open water at the rate of 300 gallons of spray per acre. All plants were dead in ten days and there was no replacement.

In another case, hyacinth plants were sprayed with a composition identical to that indicated above with the exception that the trans-cinnamic acid was omitted from the composition. The majority of the plants in this case were killed in about three weeks, but shortly thereafter, a multitude of new growths appeared, replacing the plants which were eliminated.

Example II

A herbicidal spray is prepared by adding 1000 P. P. M. of 2,4-dichlorophenoxyacetic acid, $\frac{1}{10}$% glycerine, 400 P. P. M. of trans-cinnamic acid and one P. P. M. eosine.

This spray composition was applied to water hyacinths ranging in height from 22 to 40 inches, growing in a shaded water channel. All plants were dead in a week to ten days and there was no replacement.

In another case, similarly growing plants were treated with a spray identical in composition except that it contained no eosine. All plants were dead in two to three weeks and there was no replacement.

Example III

A herbicidal spray is prepared by incorporating 1000 P. P. M. of 2,4-dichlorophenoxyacetic acid, $\frac{1}{10}$% glycerine and 10 P. P. M. indole propionic acid in water.

Water hyacinth plants of average height between 22 and 40 inches growing in open water were sprayed during the summer at a rate of 300 gallons of spray per acre with this composition. All plants were dead within ten days to two weeks with no replacement.

Example IV

A herbicidal spray composition is prepared by mixing three pounds of 2,4-dichlorophenoxyacetic acid with one pound of phenylacetic acid and two gallons of kerosene. This kerosene mixture is then emulsified with 300 gallons of water by the use of about 5%, based on the weight of the kerosene mixture, of an emulsifying agent, such as Turkey red oil.

This spray was applied to an open water channel heavily infested with water hyacinth plants ranging in height from 22 to 40 inches. The spray was applied at the rate of 300 gallons to the acre. All of the plants were dead within ten days and there was no replacement.

Example V

A herbicidal spray is prepared by incorporating in 300 gallons of water, 1000 P. P. M. of 2,4-dichlorophenoxyacetic acid, 10 P. P. M. of indole acetic acid, one P. P. M. of eosine and 34 P. P. M. of cuprammonium hydroxide reagent prepared by mixing copper sulphate with ammonium hydroxide.

Water hyacinths growing in an open channel in heavy profusion were sprayed during the summer at the rate of 300 gallons of the herbicide per acre. All plants were dead within ten days. The heavy mat of dead hyacinths sank within a week.

In another case in which a similar spray was used, with the exception that the cuprammonium reagent was omitted therefrom, the plants were killed in a similar length of time, but a heavy mat of dead plants resulted which did not sink, but remained floating for a considerable length of time.

The examples above are concerned with the use of 2,4-dichlorophenoxyacetic acid as the first ingredient in the production of my herbicide. While this is the preferred compound for use as the first ingredient because it appears to be most effective and to be augmented to the largest extent by the second ingredient of my herbicides, there are many other compounds which have been found to be more or less effective for this purpose.

In general, aryl substituted monocarboxylic acids of the formula AOCH(B)COOH or ACOCH(B)COOH, where A is a halogenated aryl radical and B is the radical H—, or alkyl, may be used as the first ingredient. The esters, such as methyl, ethyl, and other lower alkyl esters and salts, such as sodium, potassium and ammonium salt of these compounds, or mixtures of two or more of the compounds have also been found effective.

Specific examples of useable first ingredients include alpha halophenoxy monocarboxylic acids, e. g., 2,4-dichlorophenoxyacetic acid; 2,5-dichlorophenoxyacetic acid; 3,4,5-trichlorophenoxyacetic acid; 2,4-difluorophenoxyacetic acid; 2,4-dibromophenoxyacetic acid; 2-chlorophenoxyacetic acid; 4-chlorophenoxyacetic acid; pentachlorophenoxyacetic acid; the corresponding alpha halophenoxy derivatives of propionic and butyric acids, etc., alpha halonaphthoxy monocarboxylic acids, e. g., 3,4-dichloroalphanaphthoxyacetic acid; 3,4-dichlorobeta-naphthoxyacetic acid; 1,5,8-trichlorobeta-naphthoxyacetic acid; 2,4-difluoroalpha-naphthoxyacetic acid; 2,5-dibromoalpha-naphthoxyacetic acid; the corresponding halonaphthoxy derivatives of propionic and butyric acids, etc.; alpha halobenzoyl monocarboxylic acids, e. g., 2,4-dichlorobenzoylacetic acid; 3,4,5-trichlorobenzoylacetic acid; 2,4-difluorobenzoylacetic acid; the corresponding alpha halobenzoyl derivatives of propionic and butyric acid, etc.; the analogous alphahalonapthoylacetic, propionic, butyric, etc., acids; the halodiphenyl analogs, the halophenanthryl analogs and similar compounds.

The second ingredient of my herbicides may be classified as bud growth inhibitors. These materials comprise compounds commonly referred to as auxins, including the aryl or indole substituted aliphatic monocarboxylic acids and also arylbeta substituted acrylic acids.

Specific examples of the second ingredients include aryl substituted aliphatic saturated monocarboxylic acids, e. g., phenylacetic, naphthyl acetic, phenyl butyric, phenanthryl acetic, phenyl propionic, naphthyl butyric, diphenyl acetic and similar acids; beta aryl substituted acrylic acids, e. g., cinnamic acid, beta naphthyl acrylic acid, beta phenanthryl acrylic and similar acids; and indole substituted aliphatic saturated monocarboxylic acids and indole acrylic acid.

A general idea as to the relative proportions of the ingredients in the herbicides and the concentration in which they are applied in the treatment of plant growth can be gathered from the specific examples gives above. However, it should be understood, that the proportions of the ingredients are dependent not only upon the particular compounds which are used, but also upon the method by which they are applied to the plant and upon whether the plants are growing on land or water. Consequently, the concentration by which these compositions are applied in the treatment of plants can best be described only in general terms. Thus, the active proportions of the herbicides are generally applied at a rate which is of the order of 1 to 10 pounds per acre. The phrase "of the order of" is used advisedly since as much as 20 to 30 pounds per acre may be used or less than the indicated amount can be employed in cases, but the amount is always of this order as contrasted to materials which may be applied in the order of 100 or perhaps 1000 pounds per acre. Similarly, water or other sprays are generally prepared from my herbicides with the concentration of active ingredients of the order of 1000 P. P. M. Here again, the phrase "of the order of" is used in the similar meaning and should be contrasted to the use of mixtures of the order of 1 part to 10 or equal parts.

Although the exact concentration of ingredients and rate of application of my herbicides are largely dependent upon the indicated extraneous circumstances, I have found general limits can be placed upon these values. Thus, the first ingredient should be incorporated so as to yield about 3 pounds to the acre of weeds. The second ingredients are more dependent upon their chemical nature. Thus, trans-cinnamic acid or phenyl acetic acid should be used at the rate of one pound per acre. Indole butyric, indole acetic, naphthalene acetic, indole propionic and cis-cinnamic acids must be added in an amount of one-fortieth pound per acre.

It is possible to select the second ingredient of the formula described here for convenience in the method of treatment to be used; that is, liquid sprays, dusts, mists, vapors, or as adsorbates adhered to porous adsorbents.

These various methods of application are in turn selected in accordance with the environment of the weed, principally whether it is on land or water, or submerged in water, and also, on basis of the scale of treatment to be made. Liquid sprays are effectively used for treatment of terrestrial or floating aquatic weeds on a small scale. Mist and dust applications are effective for the same weeds in large-scale applications by plane. Vapor and adsorbate treatments are effective for weeds in a great variety of environments.

Various materials may be employed with water for use as carriers in liquid sprays of my herbicides. These carriers are selected for their function as cutin solvents for penetration of the cutinaceous layers over leaf surfaces of most weeds. Those used include an alcohol such as glycerine, effective in amounts as small as 0.1%; a light summer oil found effective in 0.5% amounts, and kerosene effective in amounts as small as 0.25%. Combination of these oil and kerosene solvents with water is accomplished by a minute addition of a non-toxic emulsifying or wetting agent.

For mist spraying by plane, the necessary two ingredients of the formula can be added in correct amounts directly to volumes of these solvents required for the area of weeds to be treated. Volumes of these solvents used per acre are six gallons of oil, one gallon of glycerine and two-thirds gallon of kerosene. For dust preparations, the two ingredients of the formula are used in amounts required to cover a particular area and are dispersed in an appropriate amount of inert solid. The required weight of dust for an acre of weeds is at least ten pounds.

The general effectiveness of my herbicides is further increased by the use of small amounts of catalysts which have been found to be effective for this purpose. Materials which may be employed in this manner include eosine, fluorescine, rhodamine, and water-soluble organic dyes having a principle adsorption band between 0.50 and 0.60 micron.

The effectiveness of these compounds in this capacity appears to arise from the fact that the herbicidal reaction influenced in the plant is a photo-chemical reaction and is catalysed by these materials, in particular eosine. The use of these additional materials is highly recommended for deeply shaded areas, e. g., a cyprus shaded water channel containing water hyacinths.

The complete elimination or disintegration in relative short periods of time of plants killed by the action of the herbicides, is generally desirable. It has been found, if materials, such as cuprammonia reagents are added to the herbicides, the rate of disintegration of the dead plants is greatly increased. Thus, cuprammonia reagents prepared from copper hydroxide and ammonium hydroxide have been found to greatly aid the disintegration of the dead plants arising from the use of my herbicides for elimination of water hyacinths. Such reagents are added to the herbicide in an amount preferably not more than 25 parts of copper and 25 parts of ammonia per million parts spray.

I claim:

1. A herbicide comprising a combination of two basic ingredients, the first of said ingredients being aryl substituted monocarboxylic compounds from the group consisting of acids of the formula:

$$AOCH(B)COOH$$

and $$ACOCH(B)COOH$$

where A is a halogenated aryl radical and B is a radical from the group H—, methyl and ethyl; and the esters and salts of said acids, the second of said ingredients being a plant bud growth inhibitor from the group consisting of compounds having the formula:

$$R(CH_2)_nCOOH$$

and $$RCH=CHCOOH$$

where R is a radical from the group phenyl, naphthyl and indolyl, and $n$ is an integer from 1 to 4.

2. A herbicide in accordance with claim 1, which contains a photo-chemical catalyst consisting of a water soluble organic dye having a principal adsorption band between 0.50 and 0.60 micron.

3. A herbicide in accordance with claim 1, which contains a cuprammonia compound.

4. A herbicide in accordance with claim 1, which contains a photo-chemical catalyst consisting of a water soluble organic dye having a principal adsorption band between 0.50 and 0.60 micron and a cuprammonia compound.

5. A herbicide comprising dichlorophenoxyacetic acid and cinnamic acid.

6. A herbicide comprising dichlorophenoxyacetic acid and indole acetic acid.

7. A herbicide comprising dichlorophenoxyacetic acid, cinnamic acid, and eosine.

8. A herbicide comprising dichlorophenoxyacetic acid, indole acetic acid and eosine.

9. A herbicide comprising dichlorophenoxyacetic acid, cinnamic acid, eosine, and cuprammonium hydroxide.

10. A herbicide comprising dichlorophenoxyacetic acid, indole acetic acid, eosine, and cuprammonium hydroxide.

11. A herbicide in accordance with claim 1, wherein the proportion of said first ingredient is between about 2.5 and 100 parts to each part of said second ingredient.

12. A herbicide comprising about 2.5 parts of dichlorophenoxyacetic acid, to each part of trans-cinnamic acid.

13. A herbicide comprising about 100 parts of dichlorophenoxyacetic acid to each part of indole acetic acid.

14. A herbicidal spray comprising a herbicide in accordance with claim 1, carried in an aqueous medium in a concentration of the order of 1000 P. P. M.

15. A herbicidal spray comprising dichlorophenoxyacetic acid and cinnamic acid carried in an aqueous medium in a concentration of the order of 1000 P. P. M.

16. A herbicidal spray comprising dichlorophenoxyacetic acid and indole acetic acid carried in an aqueous medium in a concentration of the order of 1000 P. P. M.

GLADYS S. KING.

REFERENCES CITED

The following references are of record in the file of this patent:

UNITED STATES PATENTS

| Number | Name | Date |
|---|---|---|
| 2,390,941 | Jones | Dec. 11, 1945 |

OTHER REFERENCES

Science, April 19, 1946, pages 477 to 479.
Chemical Reviews, Oct. 1946, page 207.